C. F. BUTLER.
DRAFT APPLIANCE FOR AUTOMOBILES.
APPLICATION FILED JAN. 17, 1917.
1,355,640.
Patented Oct. 12, 1920.
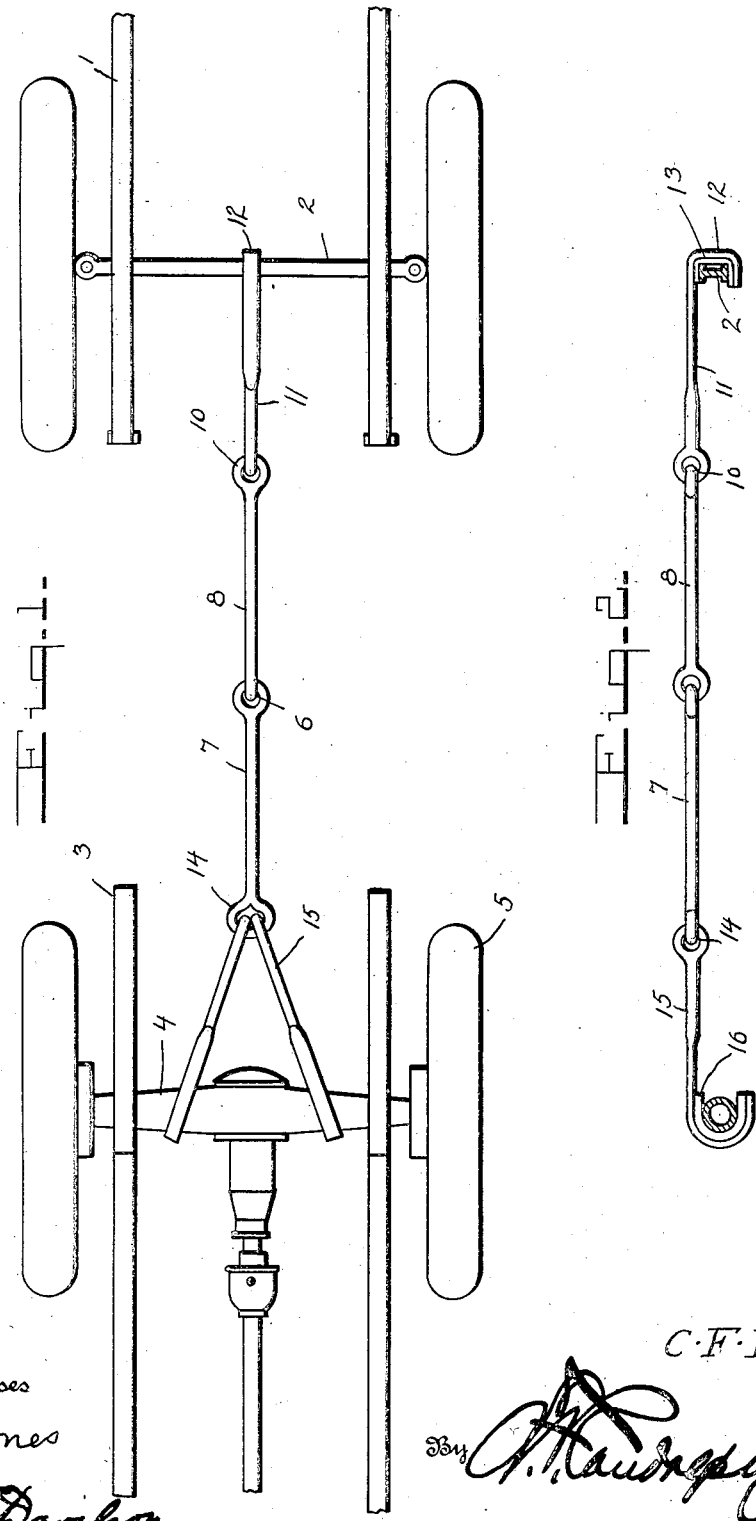
Witnesses
RM Jones
W. F. Davidson
Inventor
C. F. Butler
By
Attorney

UNITED STATES PATENT OFFICE.

CHARLTON F. BUTLER, OF MEGGETT, SOUTH CAROLINA.

DRAFT APPLIANCE FOR AUTOMOBILES.

1,355,640.     Specification of Letters Patent.     Patented Oct. 12, 1920.

Application filed January 17, 1917. Serial No. 142,850.

*To all whom it may concern:*

Be it known that I, CHARLTON F. BUTLER, a citizen of the United States, residing at Meggett, in the county of Charleston and State of South Carolina, have invented certain new and useful Improvements in Draft Appliances for Automobiles; and I do hereby declare the following to be a full, clear, and exact description of the invention, such as will enable others skilled in the art to which it appertains to make and use the same.

This invention relates to a draft appliance for automobiles and has for one of its objects the provision of a device of this character, whereby one automobile may be connected to another for the purpose of towing one automobile by the other.

Another object of this invention is to provide a rod consisting of a pair of sections pivoted together and having means pivoted to the free ends thereof for detachably connecting them to the rear axle of one automobile and to the front axle of another automobile, where the last mentioned automobile may be towed by the other automobile.

A further object of this invention is to provide a hook pivoted to one end of the rod and especially bent to fit the front axle of one automobile and a pair of hooks pivoted to the other end of the rod and so bent as to receive the rear axle of the other automobile, whereby the automobiles are coupled together, one for towing the other.

A still further object of this invention is the provision of a draft appliance for automobiles of the above stated character, which shall be simple, durable and efficient, and which may be manufactured and sold at a comparatively low cost.

With these and other objects in view as will become more apparent as the description proceeds, the invention consists of certain novel features of construction, combination and arrangement of parts as will be hereinafter more fully described and claimed.

For a complete understanding of my invention, reference is to be had to the following description, and accompanying drawing, in which:

Fig. 1 is a plan view of a draft appliance for automobile construction in accordance with my invention, illustrating it applied to the front and rear of a pair of automobiles.

Fig. 2 is a side elevation of the same, partly in section.

Referring in detail to the drawing, the numeral 1 indicates the front end of an automobile having the usual front axle 2. The automobile 1 is to represent the disabled automobile or the automobile to be towed by the automobile 3 of which the rear end is shown in Fig. 1. The rear end of the automobile 3 has the usual differential housing 4 in which the rear axle is journaled and on which the rear wheels 5 are secured.

A rod 6 consisting of sections 7 and 8 have their adjacent ends bent to form eyes 9 which interlock with each other to pivotally connect the sections together. One end of the section 8 is provided with an eye 10 to which a hook 11 is pivoted. The hooked end 12 of the hook 11 is so bent as to conform to the shape or contour of the front axle 2 of the automobile 1. The hooked end 12 is covered with rubber or like material 13 to prevent the hook 11 from marring or scratching the axle 2 of the automobile 1.

The free end of the section 8 of the rod 6 is bent to form an enlarged flared eye 14 to which hooks 15 are pivoted. The hooks 15 are so bent as to engage the differential housing 4 of the rear axle of the automobile 3 and are covered with rubber or other suitable material 16 to prevent scratching or marring of the differential housing 4, thus it will be seen that the automobiles 1 and 3 are efficiently coupled together, whereby the automobile 3 may tow the automobile 1. It will also be noted that a device has been provided which may be readily detached from the automobiles and compactly folded for storing in a comparatively small space within the automobile.

While I have shown and described the preferred embodiment of my invention, it will be understood that minor changes in construction, combination and arrangement of parts may be made without departing from the spirit and scope of the invention as claimed.

What is claimed is:

1. A towing coupling for automobiles comprising a pair of front rods having their front ends extending downwardly and rearwardly to provide axle housing engaging hooks open at their rear sides only, a rear rod having its rear end extending downwardly and forwardly to provide an axle engaging hook open at its front side only, and a pair of intermediate rods having their adjacent ends connected by a universal joint and their remote ends connected by universal joints to the rear ends of the front rods and to the front end of the rear rod.

2. In an automobile towing device, a rod consisting of sections connected together at their inner ends for relative universal movements, a pair of rear axle engaging hooks having a universal connection with one end of the rod, and a front axle engaging hook having a universal connection with the other end of the rod.

In testimony whereof I affix my signature in presence of two witnesses.

CHARLTON F. BUTLER.

Witnesses:
LENON N. DONALDSON,
B. J. DONALDSON.